United States Patent
Olarig (10) Patent No.: US 7,024,510 B2
(45) Date of Patent: Apr. 4, 2006

(54) SUPPORTING A HOST-TO-INPUT/OUTPUT (I/O) BRIDGE (75) Inventor: Sompong Paul Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 415 days.

(21) Appl. No.: 10/390,476

(22) Filed: Mar. 17, 2003

(65) Prior Publication Data

US 2004/0186942 A1   Sep. 23, 2004

(51) Int. Cl.
*G06F 13/36* (2006.01)

(52) U.S. Cl. ............................... 710/311; 710/312

(58) Field of Classification Search ............ 710/311, 710/312

See application file for complete search history.

(56) References Cited

U.S. PATENT DOCUMENTS

| | | | |
|---|---|---|---|
| 3,641,505 A * | 2/1972 | Artz et al. | 710/100 |
| 5,450,549 A * | 9/1995 | Casparian | 345/556 |
| 5,878,237 A * | 3/1999 | Olarig | 710/309 |
| 6,191,998 B1 * | 2/2001 | Reddy et al. | 365/230.05 |
| 6,751,698 B1 * | 6/2004 | Deneroff et al. | 710/317 |
| 6,910,108 B1 * | 6/2005 | Downer et al. | 711/141 |
| 6,912,612 B1 * | 6/2005 | Kapur et al. | 710/309 |

FOREIGN PATENT DOCUMENTS

| EP | 380851 A2 * | 8/1990 |
|---|---|---|
| GB | 2253725 A * | 9/1992 |

* cited by examiner

*Primary Examiner*—Paul R. Myers (57) ABSTRACT

In a computer system, a host-to-I/O bridge (e.g., a host-to-PCI-X bridge) includes core logic that interfaces with at least two host buses for coupling a central processing unit(s) and the bridge, and interfaces with at least two PCI-X buses for coupling at least two PCI-X devices and the bridge. The core logic includes at least two PCI-X configuration registers adapted to have bits set to partition the core logic for resource allocation. Embodiments of the present invention allow the system to program the logical bus zero to behave as a single logical bus zero or partition into two or more separate "bus zero" PCI-X buses with their own configuration resources. Partitioning allows performance and functional isolation and transparent I/O sharing.

34 Claims, 4 Drawing Sheets

SUPPORTING A HOST-TO-INPUT/OUTPUT (I/O) BRIDGE

CROSS-REFERENCE TO RELATED APPLICATIONS

Not applicable.

STATEMENTS REGARDING FEDERALLY SPONSORED RESEARCH OR DEVELOPMENT

Not applicable

REFERENCE TO A MICROFICHE APPENDIX

Not applicable.

BACKGROUND OF THE INVENTION

1. Field of the Invention

The present invention is related to supporting input/output (I/O) slots in computer systems, and, in particular, supporting multiple I/O peripheral component interconnect (PCI) slots without adding latencies while providing for new and existing I/O requirements.

2. Description of the Related Art

PCI is described in the *PCI Local Bus Specification, Revision* 2.2 (hereinafter the General PCI Specification) available from the PCI Special Interest Group. The PCI bus has sufficient data bandwidth for high performance peripherals, such as a video controller, high speed network interface card(s), hard disk controller(s), SCSI adapter, wide area network digital router, and the like. The PCI bus can operate at 33 MHz or 66 MHz. A PCI bus operating at 33 MHz may have a plurality of card connectors (or slots) attached thereto. But, as sophisticated graphics and increased network data transfer requirements place upward pressure on the PCI buses for faster data transfers between the computer system main memory, host processor(s), peripherals, and data from other computers on the network, 66 MHz operation is preferred, and in some cases mandatory. When the PCI bus runs at 66 MHz, however, the number of card connectors is limited to two because of the timing constraints of the digital control signals. Therefore, a plurality of PCI-to-PCI bus bridges is required to provide enough PCI device card connectors for a typical computer system, such as a network server or graphics workstation. These PCI-to-PCI bus bridges create new PCI bus numbers and introduce increasingly complex data protocol and handshake requirements, multiple delayed transactions, additional bus latency, and potential deadlock cycles.

PCI-X (extended PCI) is described in the *PCI-X Addendum to the PCI Local Bus Specification, Revision* 1.0 (hereinafter the PCI-X Specification), also available from the PCI Special Interest Group. Similar to the 66 MHz PCI bus, the PCI-X bus is designed to provide connectivity to even higher bandwidth devices, such as three-dimensional (3D) graphics and gigabit I/O devices. Both the 66 MHz PCI and the PCI-X buses are considered as compatible supersets of the standard PCI bus with minimal differences. To identify 66 MHz PCI or PCI-X devices, one static signal is added by defining an existing ground pin, and one bit is added to the Configuration Status register. Bus drivers are basically the same as for 33 MHz operation, but require faster timing parameters and redefined measurement conditions. As a result, the limited number of connectors (e.g., 1 or 2) mentioned above is recommended.

PCI-X buses include their own logic circuits and signal protocols. According to the PCI-X Specification, all signals are sampled on the rising edge of the PCI bus clock and only the PCI-X version of these signals is used inside PCI-X devices. In the current General PCI Specification, there are many instances in which the state of an input signal setting up to a particular clock edge affects the state of an output signal after that same clock edge. This type of I/O signal behavior is not possible in a PCI-X interface. Thus, PCI-X introduces the concept of a clock-pair boundary, which replaces some single-clock-edges where control signals change. Timing on the PCI-X bus is not as critical as for the aforementioned 66 MHz PCI in the General PCI Specification, even when the PCI-X bus runs faster than 133 MHz. The PCI-X Specification allows PCI bus operation with more than two PCI device cards.

In server environments, Microsoft Corporation has been championing so-called dynamic hardware partitioning (DHP) as the next generation system architecture. DHP enables multiple operating system instances in one server. One issue is to determine how to support multiple I/O (PCI) connectors without adding additional latencies and cost while still satisfying the existing and new I/O requirements. Currently, there are no PCI bridges that support DHP.

BRIEF SUMMARY OF THE INVENTION

Certain embodiments of the invention feature a host-to-I/O bridge included in core logic with interfaces for at least two host buses adapted to couple a central processing unit(s) and the host-to-I/O bridge, and interfaces for at least two I/O (e.g., PCI-X) buses adapted to couple at least two I/O (e.g., PCI-X) devices and the host-to-I/O bridge. The at least two I/O buses are adapted to be defined as the same logical bus number, for example, logical bus zero. In certain other embodiments of the invention, the core logic also includes at least two PCI-X configuration registers adapted to partition the core logic for resource allocation.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

Embodiments of the present invention are capable of supporting all features of the PCI-X protocol, and are fully backward compatible with the PCI-X specification and other PCI Special Interest Group specifications (i.e., fully compatible with the full PCI and PCI-X system architectures, including peer-to-peer PCI bus-to-PCI bus and peer-to-peer PCI-X bus-to-PCI-X bus transactions). Although PCI-X is a superset of the PCI bus, if PCI is mentioned herein, it is meant to include PCI-X, unless otherwise specified. These embodiments conform to or enhance industry standards for PCI and PCI-X under the General PCI Specification and the PCI-X Specification, which are incorporated by reference herein in their entireties, and these embodiments are capable of mixed mode operation, in which PCI-only and PCI-X-compatible devices can operate concurrently.7

Embodiments of the present invention may be implemented in a computer system. For most applications, these embodiments do not require a PCI-to-PCI bridge or a PCI-X-to-PCI-X bridge. In these embodiments, it is easy for the system software to perform bus enumeration. Because there is no bus N+1 to re-enumerate, these embodiments may be more hot plug friendly. Also, the computer systems incorporating embodiments of the present invention experience less latency with multiple PCI-X-compatible devices than prior art bridges and configurations. Overall, input/output (I/O) latencies are lowered because most I/O transactions can occur concurrently and economies of scale realized when the same chipset is used in various applications.

Figure 1:
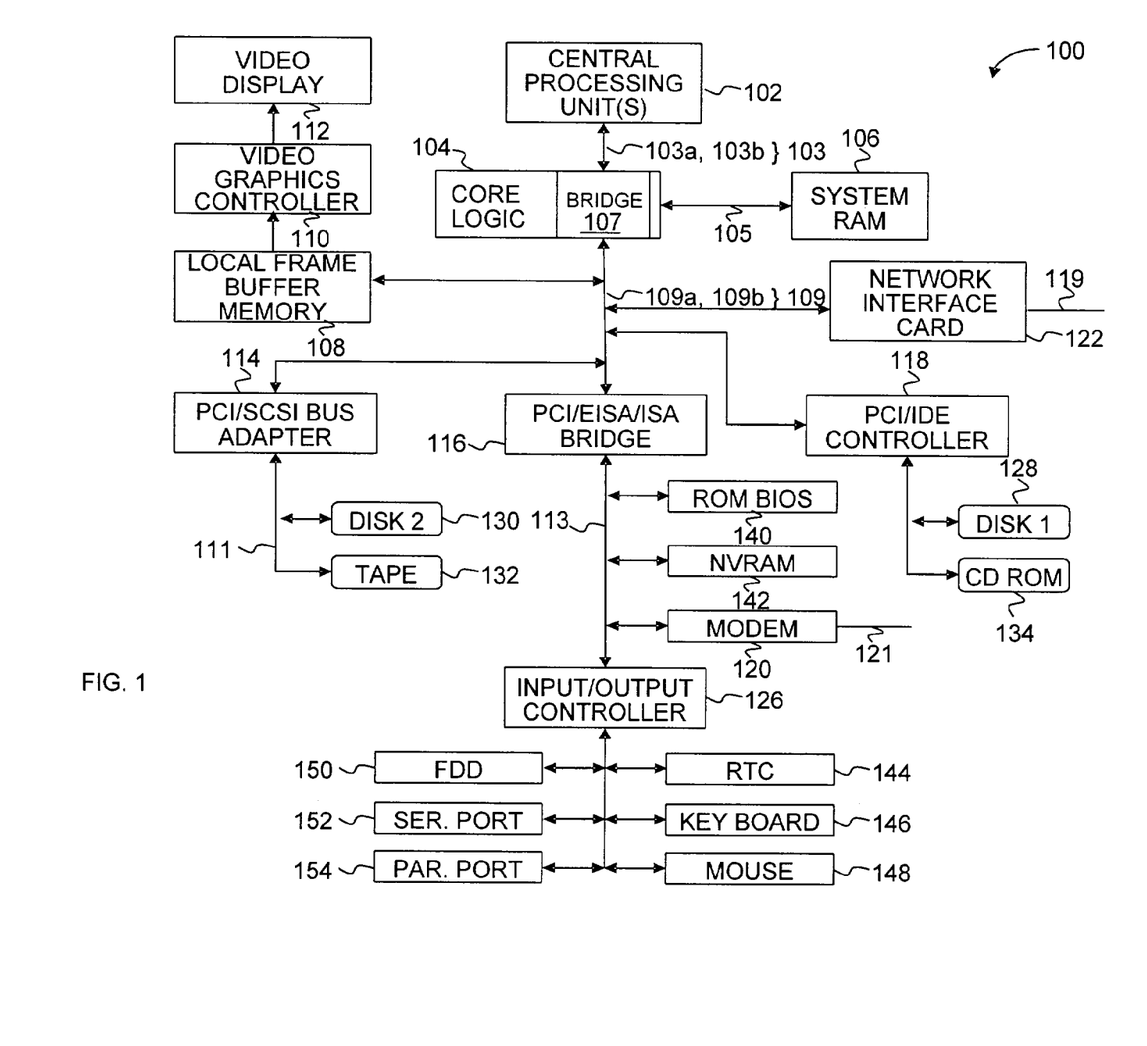
FIG. 1 is an exemplary block diagram of a computer system that supports a dual mode logical bus zero host-to-I/O (e.g., PCI-X) bridge, in accordance with an embodiment of the invention.

Referring to the drawings, FIG. 1 shows an exemplary schematic block diagram of a computer system, in accordance with an embodiment of the present invention. The computer system is generally indicated by the numeral 100 and includes central processing unit(s) (CPU) 102, core logic 104 ("North Bridge"), system random access memory (RAM) 106, a video graphics controller 110, a local frame buffer 108, a video display 112, a bus adapter (e.g., PCI/SCSI bus adapter)114, a "South Bridge" (e.g., a PCI/EISA/ISA bridge) 116, a controller (e.g., PCI/IDE controller) 118, and, optionally, a network interface card (NIC) 122. Single or multilevel cache memory (not illustrated) may also be included in the computer system 100, according to the current art of microprocessor computer systems. The CPU 102 may be a plurality of CPUs in a symmetric or asymmetric multi-processor configuration. The core logic 104 may be embedded or programmable, or either, in different embodiments.

The CPU 102 is connected to the core logic 104 through a CPU host bus 103. There may be more than one host bus, as indicated by 103a and 103b in FIG. 1. The system RAM 106 is connected to the core logic 104 through a memory bus 105. The core logic 104, which may be an application specific integrated circuit (ASIC), as will be appreciated by those skilled in the art, includes a host-to-I/O bridge 107 (e.g., a host-to-PCI-X bridge) between the host bus 103, the memory bus 105 and an I/O bus(es) 109 (e.g., a PCI-X bus(es)) operating under the PCI-X Specification and the General PCI Specification. The I/O bus(es) could also be a serial point-to-point bus(es), such as PCI Express, as described in the PCI Express Specification 1.0, which is incorporated by reference herein in its entirety. More than one I/O bus 109 is contemplated, as will be described below. The core logic 104 also includes the following: I/O (e.g., PCI-X) read/write queues; CPU read/write queues; memory read/write queues; I/O (e.g., PCI-X) bus interfaces; dual CPU interfaces; a memory interface and control; an I/O (e.g., PCI-X) address comparator; a (e.g., PCI-X) target flow controller; and an (e.g., PCI-X) arbiter, as will be appreciated by those skilled in the art. A clock, for example, a phase locked loop (PLL) clock, can be included to synchronize data transmissions among the various devices.

The local frame buffer 108 is connected between the video graphics controller 110 and the bus 109. The bus adapter 114, bridge 116, PCI/IDE controller 118 and the NIC 122 are connected to the core logic 104 through the bus 109. Some of these (e.g., PCI-X) devices, such as the video controller 110 and NIC 122, may plug into PCI connectors on a motherboard 200 (FIG. 2) of the computer system 100. The NIC 122 also may be connected to a local area network 119.

Hard disk 130 and tape drive 132 are connected to the bus adapter 114 through a SCSI bus 111. The bridge 116 is connected over an EISA/ISA bus 113 to a ROM BIOS 140, non-volatile random access memory (NVRAM) 142, modem 120, and I/O controller 126. The modem 120 is connected to a telephone line 121. The I/O controller 126 is interfaced with a keyboard 146, real time clock (RTC) 144, mouse 148, floppy disk drive (FDD) 150, serial port 152, and parallel port 154. The EISA/ISA bus 113 is a slower information bus than the (e.g., PCI-X) bus 109, but its interfacing may cost less.

When the computer system 100 is first turned on, start-up information stored in the ROM BIOS 140 is used to commence operation. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to transfer information properly from the disk 130 to the CPU 102. In the computer system 100 illustrated in FIG. 1, the bus adapter 114 is configured to respond to commands from the CPU 102 over the PCI-X bus 109 and transfer information from the disk 130 to the CPU 102 via buses 109 and 103. The bus adapter 114 is, for example, a PCI device and remains platform independent. Therefore, separate hardware independent commands may be used to set up and control any (e.g., PCI) device in the computer system 100. These hardware independent commands are located in BIOS (e.g., PCI BIOS) contained in the computer system ROM BIOS 140. The PCI BIOS is hardware specific firmware that meets the General PCI Specification. Plug and play and PCI devices in the computer system are detected and configured when a system configuration program is executed. The results of the plug and play and PCI device configurations are stored in the NVRAM 142 for later use by the startup programs in the ROM BIOS 140 and the BIOS (e.g., PCI BIOS) that configure the necessary computer system 100 devices during startup. Also during startup, a built-in-self-test (BIST) may perform diagnostic testing of components, such as PCI devices, in the computer system 100.

Figure 2:
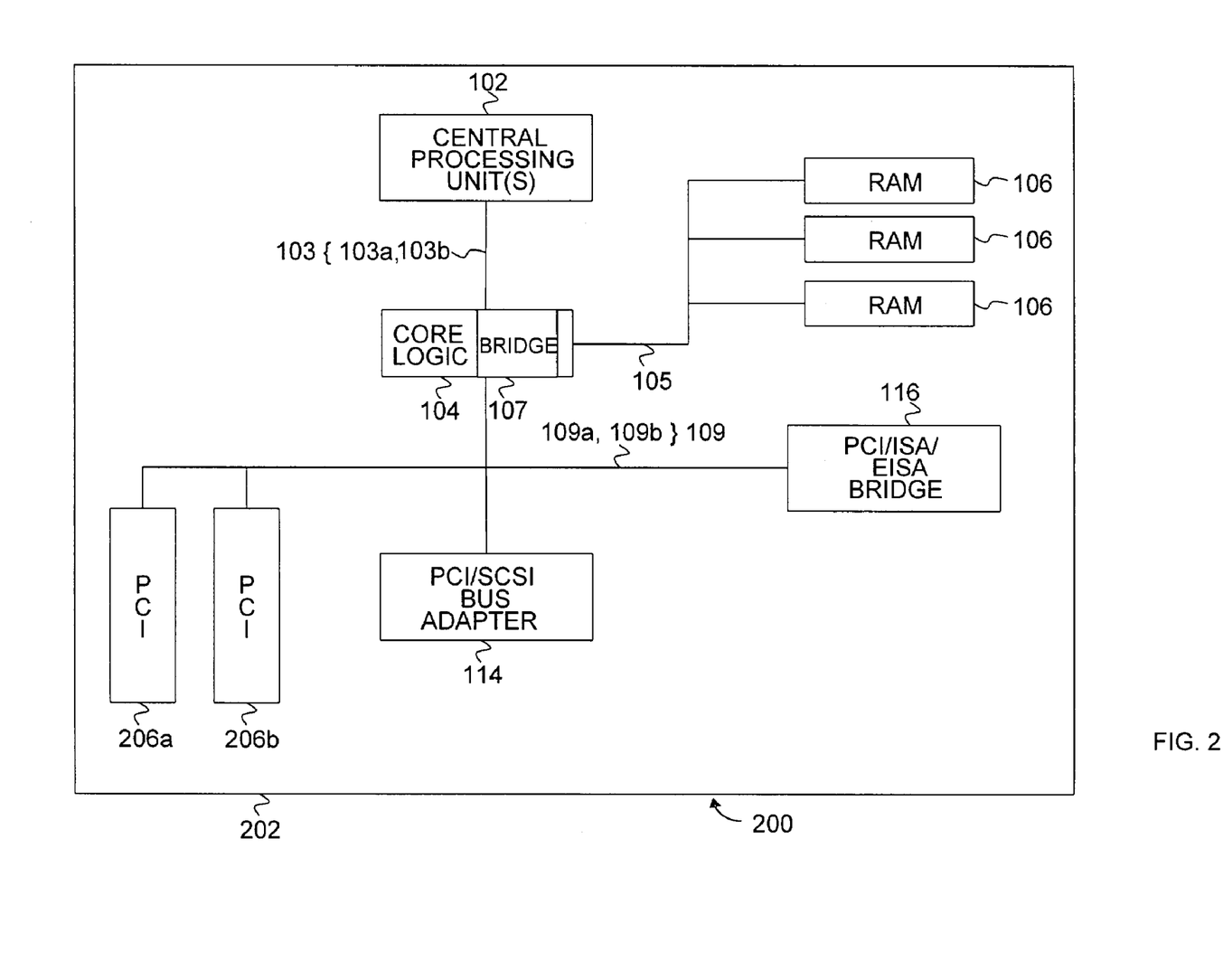
FIG. 2 is an exemplary diagram of a printed circuit motherboard of the computer system of FIG. 1.

FIG. 2 shows a schematic diagram of the exemplary computer system motherboard 200 according to FIG. 1. The computer system motherboard 200 includes printed circuit board 202 on which components and connectors are mounted. The printed circuit board 202 includes conductive printed wiring used to interconnect these components and connectors. The conductive printed wiring may be arranged into signal buses (illustrated as the buses 103, 105 and 109) having controlled impedance and signaling characteristics. The core logic 104 with its host-to-I/O bridge 107, CPU(s) 102, RAM 106, embedded PCI/ISA/EISA bridge 116, embedded PCI/SCSI bus adapter 114, and PCI connectors 206a, 206b are illustrated on the printed circuit board 202. The motherboard 200 may be assembled (not illustrated) into a case with power supply, disk drives, etc., which form the computer system 100 of FIG. 1.

Figure 3:
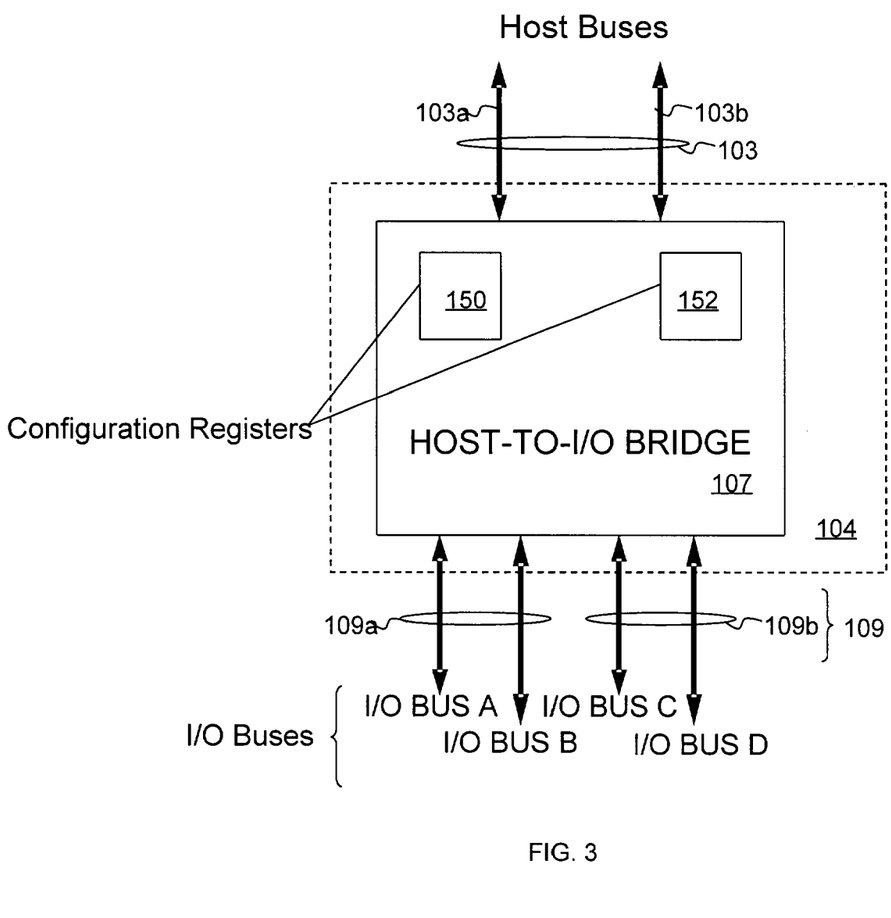
FIG. 3 is an exemplary block diagram of a host-to-I/O bridge of a computer system, in accordance with an embodiment of the invention.

Referring again to FIGS. 1 and 2, PCI-X-to-PCI-X or PCI-X-to-PCI-X bridges may be absent from the computer system 100, as discussed. Instead of requiring multiple PCI-X-to-PCI-X bridges for a plurality of 66 MHz PCI-X devices, the core logic 104 interfaces and connects to the physical PCI-X bus 109, as illustrated in FIG. 3 in more detail. FIG. 3 is a possible embodiment of the host-to-I/O bridge 107 of the core logic 104 of FIGS. 1 and 2, showing the PCI-X bus(es) 109 of FIGS. 1 and 2 as two sets of PCI-X buses 109*a* and 109*b*. The PCI-X buses 109*a* are labeled, for example, PCI-X A and PCI-X B, and the PCI-X buses 109*b* are labeled, for example, PCI-X C and PCI-X D, each coupled to or capable of being coupled to other PCI-X (and PCI) compatible devices in the computer system 100. More physical PCI-X buses are contemplated in other embodiments. The PCI-X buses 109*a* and 109*b* are capable of operation at 66 MHz using both 32-bit and 64-bit transactions, as more fully defined in the PCI-X Specification.

Embodiments of the present invention, such as in FIGS. 1–3, provide a chip set (e.g., the core logic 104) in a computer system (e.g., the computer system 100) capable of implementing a host-to-I/O bridge 107 (e.g., the PCI-X bridge) between one (or more) host bus(es) 103 coupling a host processor(s), for example, the CPU(s) 102), memory buses (e.g., the bus 105), and one or more buses 109 (e.g., the PCI-X bus(es) 109*a* and 109*b*). The bus(es) 109 all have the same logical bus number (e.g., logical bus zero). These embodiments simplify the I/O (e.g., PCI or PCI-X) bus scan, especially during a hot removal/insertion of a device (e.g., PCI or PCI-X device). In addition, peer-to-peer transactions (e.g., from one PCI bus to another PCI bus or one PCI-X bus to another PCI-X bus) are also supported. These embodiments allow the system to program the logical bus zero to:

(1) Behave as a single logical bus zero, as described in U.S. Pat. No. 6,175,889 to Olarig, entitled "Apparatus, Method and System For a Computer CPU and Memory to High Speed Peripheral Interconnect Bridge Having a Plurality of Physical Buses with a Single Logical Bus Number," incorporated by reference herein in its entirety; or (2) Partition into two or more separate "bus zero" (e.g., PCI-X) buses with their own configuration resources. The partitioning is useful for performance and functional isolation and transparent I/O sharing.

The PCI-X bus(es) 109 (PCI-X A-D) shown in FIG. 3 are exemplary of the physically separate I/O buses capable of independent concurrent transactions, and appear to the computer 100 startup and operating system software as the one logical bus (e.g., logical bus zero). This greatly simplifies keeping track of, for example, PCI-X devices connected in the computer system because all (e.g., PCI-X) devices are on only one logical bus, with each device having its own unique device number (e.g., 1–16). The computer system software does not have to remember which device is on which logical bus number, and there is no possibility that a PCI-X device bus number will change, causing a system startup problem. Further, certain configuration transactions, such as no PCI-X-to-PCI-X bridge Type I configuration transactions, do not take place because only one logical bus is used. Embodiments of the present invention thus simplify and allow speed-up of recognition of the PCI-X devices on multiple PCI-X buses in the computer system 100, and improve transaction times.

Besides being implemented in the disclosed embodiment in the computer system 100 of FIGS. 1 and 2, it should be understood that embodiments of the present invention could be implemented in a variety of other computer systems having the same, similar, or other computer buses. For example, the present invention might be implemented in a computer system employing a serial point-to-point bus, such as 3GIO or PCI Express by PCI SIG or HyperTransport™ by the HyperTransport Technology Consortium, or others employing a parallel bus.

As will be appreciated by those skilled in the art, in typical servers or high-end computers, although the CPU can communicate with any bus and any bus can communicate with any other bus, only one bus can be communicated with at a time by the CPU or another bus. The CPU also can communicate with any (e.g., PCI or PCI-X) device on any bus. That is the so-called "no-redundancy" or "no fault-on" mode of operation. However, embodiments of the present invention provide support for a multiple (e.g., dual) mode logical bus zero host-to-I/O (e.g., PCI-X) bridge 107 of the computer system 100, and hardware partitioning also is supported, which means that hardware on the bus(es) 109 can be partitioned specifically to provide for redundancy. For example, the partitioning can be implemented in or imposed on hardware resources, such as the host-to-I/O bridge 107 or PCI-X compatible initiator or target devices on the PCI-X bus(es), by programming the core logic 104. Partitioning creates separate or different independent domains in which not all the hardware in the computer system 100 are in the same logical domain. Partitioning is like having duplicate and parallel hardware, for example, in which the hardware, such as the host-to-I/O bridge 107, associated with all the partitions, reside physically in the same chip, but are logically independent. In the non-partition (or "normal") mode, all the partitionable portions of the hardware might be used together as one unit or system, or only one of the portions might be used while ignoring (i.e., not using) the rest.

If the partition is dual (or two-fold), for example, the first partition cannot communicate with the second partition, which means devices on the first partition's bus(es) cannot communicate with devices on the second partition's bus(es). Dual partitioning, for example, effectively creates two computers. Multiple partitions also are contemplated in other embodiments, and multiple partitioning effectively creates multiple computers. The only way to communicate across the partitions would be through the main CPU 102, which still can communicate with any of the devices, no matter the partitioning. Partitioning allows hardware resources to be allocated such that the same core logic 104 can run different applications on the different partitions. With dual partitioning, resources are mapped to one or the other partition, and with multiple partitioning, they are mapped amongst specific partitions. System software may shut down one or more partitions dynamically without affecting the other partition(s).

As will be appreciated by those skilled in the art, the typical PCI configuration sets up the core logic, and provides or specifies certain attributes for the core logic and the memory map/memory address space. In embodiments of the present invention, a (e.g., PCI or PCI-X) configuration also sets up the core logic 104. With dual partitioning, for example, according to the disclosed embodiment shown in FIG. 3, a crossbar switch (discussed in more detail with respect to FIG. 4 below) between the core logic 104 (e.g., chip) halves can be disconnected or deactivated, and operation can proceed effectively as two separate computers, as discussed.

The partitioning using the crossbar switch can be turned on and off, for example, by using and setting an activation/deactivation bit or bits in the core logic 104, or by setting a bit(s) in any vendor-specific PCI registers or memory-mapped I/O. In other words, bit(s) could be set at some PCI memory address and used to turn on/off partitioning. Unused bits in PCI or PCI-X (e.g., reserved bits), or signals multiplexed with other bit signals used in PCI or PCI-X, also could be used for turning on/off partitioning, although, generally, such embodiments may not be quite as advantageous because of a potential future compatibility issue.

As will be appreciated by those skilled in the art, configuration or vendor specific bits are available for use in the PCI or PCI-X configuration space in the core logic 104. According to the disclosed embodiment in FIG. 3, two configuration registers 150 and 152, for example, could be used to activate and control (i.e., to turn on or off) the two-fold partitioning. Similarly, other such registers could be used to activate/deactivate and control multiple partitioning. These registers can store the configuration or vendor specific bits used for activating/deactivating partitioning in the PCI configuration space of the exemplary embodiments. In other embodiments, bits could be set at a PCI memory address, as indicated above. Further information about the configuration space is available in the General PCI Specification and in the PCI-X Specification.

When activated using the configuration registers 150 and 152, partitioning enables multiple computing elements, including multiple I/O. Either one or both of the configuration registers 150 or 152 could be enabled (i.e., activated)/disabled (i.e., deactivated) by either system software or hardware, for example, by use of signals (V, corresponding to mode select 0 or 1) applied to an external I/O pin 160 with a pull-up or down resistor 162 (see FIG. 4), to specify or select the normal or partition mode. Such external I/O pin 160 would be coupled to the core logic 104 (e.g., ASIC) containing the bridge 107 and the registers 150 and 152.

In one embodiment, to simplify the design, if the partition mode is selected, then only the contents of the configuration register 150 will be used and the contents of the configuration register 152 will be ignored (or vice versa). In this embodiment, a master relationship exists in which the configuration register 150 contains the master bit or bits that override the bit or bits in the configuration register 152, and the partitioned mode will depend only on the setting of the master bit or bits. In another embodiment, both registers are peers (i.e., no master relationship) and both registers must be activated to establish the partitioned mode. In this latter embodiment, the contents of both the registers 150 and 152 are set to be identical for operation in the partition mode, similar to a logical AND. If the contents are not the same for activation of the partitioned mode, then the normal mode is selected by default and the system software is notified of any discrepancy. For either embodiment, upon resetting the configuration or vendor-specific bit(s) or other bit(s) used for partitioning to a partitioning inactivation value(s), the partitioning is turned off.

Figure 4:
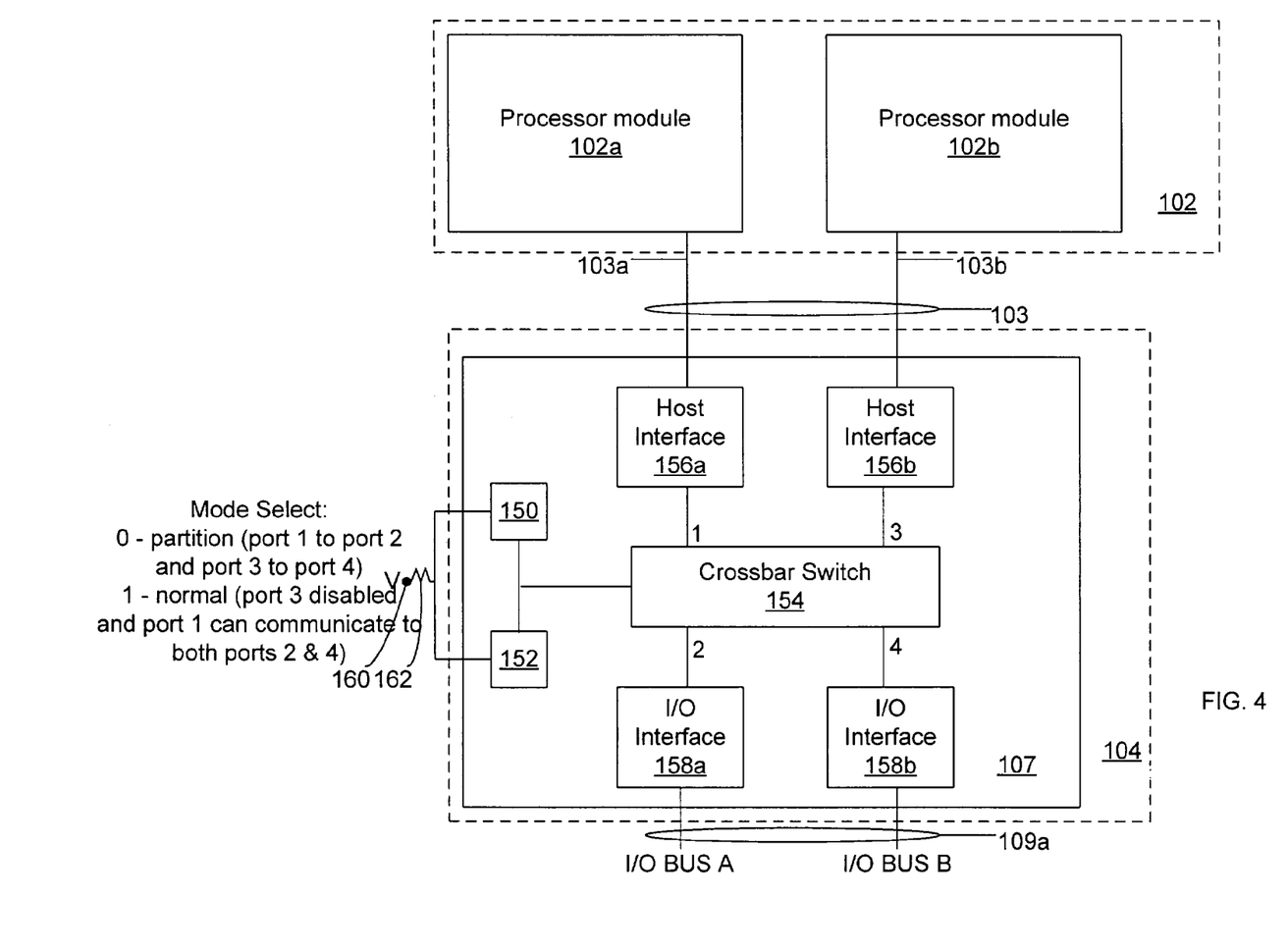
FIG. 4 is an exemplary block diagram of a host-to-I/O (e.g., PCI-X) bridge of a computer system, in accordance with an embodiment of the invention.

Referring to FIG. 4 for a more detailed description of the crossbar switch, the core logic 104 can be divided effectively in two by turning off a crossbar switch 154 in the host-to-bridge 107 using the contents of the configuration registers 150 and 152, in accordance with an exemplary embodiment of the invention. FIG. 4 shows CPU(s) 102 as two CPUs 102a and 102b coupled (i.e., coupled should be understood to mean electrically coupled herein) by the two different host buses 103a and 103b, respectively, to the host-to-I/O bridge 107. The host buses 103a and 103b are coupled to host interfaces 156a and 156b, respectively, which in turn are coupled to the crossbar switch 154 via ports 1 and 3 of the crossbar switch 154. The host interfaces 156a and 156b might be, for example, processor front-side buses, such as in the Intel® Xeon™ processor packages. The crossbar switch 154 is coupled via its ports 2 and 4 to I/O bus interfaces 158a and 158b (e.g., PCI-X bus interfaces), which are in turn coupled to the I/O buses 109a (I/O bus A and I/O bus B, e.g., PCI-X A and PCI-X B, or serial point-to-point buses such as PCI Express). Also, the crossbar switch 154 is coupled to the I/O configuration registers 150 and 152, which are used to control the partitioning of hardware resources, as discussed above.

As indicated in the legend to the embodiment shown in FIG. 4, and as discussed above, the contents or states of the configuration registers 150 and 152 determine whether partitioning is activated or deactivated much like AND gate logic. If both of the registers 150 and 152 in the bridge 107 in the core logic 104 have assigned partition activation/deactivation bits set to the active state (e.g., logical 1), similar to AND gate logic, then the mode of the crossbar switch 154 is selected to turn on two-fold partitioning, as follows. As indicated in the legend to FIG. 4, with the mode select set therefore to 1, partitioning is activated and port 1 can communicate signals with port 2 through the crossbar switch 154 between the processor module 102a and the host interface 156a on one side of the crossbar switch 154, and the I/O interface 158a and the portion of the hardware associated with that partition (e.g., one-half) via the I/O bus A on the other side of the crossbar switch 154. Likewise, with partitioning activated, port 3 can communicate signals with port 4 through the crossbar switch 154 between the processor module 102b and the host interface 156b on one side of the crossbar switch 154, and the I/O interface 158b and the other portion of the hardware associated with that partition (e.g., also one-half) via another I/O bus B on the other side of the crossbar switch 154. But, port 1 cannot communicate with port 4 and port 3 cannot communicate with port 2. Thus, partitioning is effectuated.

By contrast, if either or both of the registers 150 and 152 in the bridge 107 in the core logic 104 have assigned partition activation/deactivation bits set to an inactive state (e.g., logical 0), again similar to AND gate logic, then the mode of the crossbar switch 154 is selected to turn off two-fold partitioning (i.e., "normal" mode). As indicated in the legend to FIG. 4, with the mode select set to 0, partitioning is deactivated, which disables port 3, and port 1 can communicate signals with ports 2 and 4 through the crossbar switch 154 between the processor module 102a, and the host interfaces 156a and 156b on one side of the crossbar switch 154, and the I/O interfaces 158a and 158b and all the hardware coupled via the I/O buses A and B on the other side of the crossbar switch 154. In this case, the processor module 102b is not used. In the alternative embodiment indicated above, switching between the partitioned mode and the normal mode can be effected if just one of the configuration registers (e.g., 150) is the master whose state (e.g., logical 0 or 1) determines the mode no matter the state of the other configuration register (e.g., 152).

Partitioning previously has been accomplished only at the system level where everything (i.e., all hardware) was duplicated. Separation was at the backplane or at the server, such as in Infiniband™. In the typical operating mode, for a chassis base, all slots on one side (left or right) can talk to each other and likewise all elements on one side can talk to each other. But, with multiple chassis, only member elements in the same partition can talk to each other. Embodiments of the present invention, however, allow separation to be accomplished at the hardware level instead of at the system level. The hardware effectively is resized or redistributed in the same physical housing, and the core logic 104 can be used for accomplishing the hardware partitioning by programming, thus, reducing the system cost.

According to embodiments of the invention, therefore, there could be multiple system buses on the host (CPU) side of the host-to-I/O bridge. This allows the effective number N of CPUs to be increased such that the number of system buses could be 2N or twice the number N of CPUs. Hardware partitioning is supported by dividing the core logic 104 into two halves or a greater number of symmetric partitions, although it is contemplated that division could be into two or more asymmetric partitions instead. The particular partitioning would depend on design and application. Symmetric partitioning may be easier to implement, however, because, as the partitions are functionally the same, it is easier for system software and hardware to construct and manage them.

According to embodiments of the invention, it is thus possible to have multiple computers in one system using the core logic 104. The core logic 104 can be a chip that satisfies high-end partitioning, but still could be used in high volume non-partitioning. In other words, the core logic 104 chip is versatile and could be used as a normal host-to-I/O (e.g., PCI-X) bridge or in high availability mode (i.e., partitioning mode) to support higher volume. Partitioning allows performance and functional isolation and transparent I/O sharing. Embodiments of the present invention could help bring costs down and improve margins.

The foregoing disclosure and description of the embodiments are illustrative and explanatory thereof. Various changes in the components, circuit elements, circuit configurations, signals, and signal connections, as well as in the details of the illustrated circuitry and construction and method of operation may be made without departing from the spirit and scope of the invention.

We claim:

1. A dual-mode host-to-I/O bridge, comprising:
   core logic, the core logic including:
      interfaces for at least two host buses adapted to couple a central processing unit(s) and the host-to-I/O bridge;
      interfaces for at least two I/O buses adapted to couple at least two I/O devices and the host-to-I/O bridge, wherein the at least two I/O buses are defined as the same logical bus number; and
      configuration logic adapted to selectively set the host-to-I/O bridge in one of at least a non-partitioned mode and a partitioned mode, wherein the at least two I/O buses behave as a single I/O bus in the non-partitioned mode, and wherein the at least two I/O buses behave as separate I/O buses having the same logical bus number in the partitioned mode.

2. The bridge of claim 1, wherein the at least two I/O buses are defined as logical bus zero.

3. The bridge of claim 1, wherein the host-to-I/O bridge comprises a host-to-PCI-X bridge.

4. The bridge of claim 1, wherein the configuration logic comprises at least two configuration registers in the core logic adapted to partition the core logic into at least two partitions.

5. The bridge of claim 4, wherein the configuration registers are set for dividing the bridge to accommodate partitioning for the at least two I/O buses.

6. The bridge of claim 4, wherein the configuration registers are set for partitioning the bridge into multiple partitions.

7. The bridge of claim 4, wherein a portion of the bridge is dedicated to each partition.

8. The bridge of claim 4, wherein the at least two configuration registers are set to support symmetric hardware partitioning.

9. The bridge of claim 4, wherein the at least two configuration registers are set to support asymmetric hardware partitioning.

10. The bridge of claim 4, wherein the central processing unit(s) recognizes all devices coupled to the host-to-I/O bridge as logical bus zero.

11. The bridge of claim 4, wherein the interfaces and the at least two configuration registers are comprised in a single chip.

12. The bridge of claim 4, wherein the at least two configuration registers can store configuration or vendor specific bits in a PCI configuration space of the host-to-I/O bridge.

13. The bridge of claim 4, wherein the at least two configuration registers comprise bits set, or vendor specific bits set, or bits set in an address in a portion of a PCI configuration space of the host-to-I/O bridge.

14. The bridge of claim 4, wherein a one-half portion of the bridge is dedicated to each partition.

15. The bridge of claim 1, wherein the at least two I/O buses comprise PCI-X buses.

16. The bridge of claim 1, wherein the at least two I/O buses comprises serial point-to-point buses.

17. The bridge of claim 1, wherein the at least two I/O buses comprise PCI Express buses.

18. The bridge of claim 1, wherein the configuration logic selects one of the partitioned mode and the non-partitioned-mode in response to a signal applied to an external pin coupled to the core logic.

19. The bridge of claim 1, wherein the configuration logic selectively sets one of the partitioned mode and the non-partitioned mode in response to configuration bits or vendor-specific bits set in the core logic.

20. The bridge of claim 1, wherein the configuration logic selectively sets one of the partitioned mode and the non-partitioned mode in response to activation/deactivation bits set in the core logic.

21. The bridge of claim 1, wherein the configuration logic selectively sets one of the partitioned mode and the non-partitioned mode in response to register values set in the core logic.

22. The bridge of claim 1, wherein the configuration logic selectively sets one of the partitioned mode and the non-partitioned mode in response to the contents of at least one register in the core logic.

23. The bridge of claim 22, wherein the partitioned mode is set when the contents of two registers in the core logic have a first value and the non-partitioned mode is set when the contents of two registers in the core logic have a second value.

24. The bridge of claim 1, wherein the partitioned mode and the non-partitioned mode are effected by a crossbar switch in the core logic.

25. The bridge of claim 1, wherein the partitioned mode and the non-partitioned mode are effected by a crossbar switch in the core logic whose state is programmable by either software or hardware.

26. A computer system, comprising:
   a central processing unit(s);
   means for coupling at least one host bus to the central processing unit(s) and a core logic;

means for coupling at least two I/O buses to at least two I/O devices and the core logic, wherein the at least two I/O buses are defined as the same logical bus number;

means for selectively setting the core logic in one of at least a non-partitioned mode and a partitioned mode, wherein, in the non-partitioned mode, the at least two I/O buses behave as a single I/O bus, and, in the partitioned mode, the at least two I/O buses behave as separate I/O buses having the same logical bus number; and when the partitioned mode is set, means for partitioning the core logic into at least two partitions for carrying out independent functions in the computer system.

27. The computer system of claim 26, wherein the core logic comprises a host-to-I/O bridge.

28. The computer system of claim 26, wherein the core logic comprises a PCI-X bridge.

29. The computer system of claim 26, wherein the at least two I/O buses comprise at least two PCI-X buses.

30. The computer system of claim 26, wherein the means for partitioning the core logic produces symmetric or asymmetric partitioning of the core logic.

31. The computer system of claim 26, wherein the at least two I/O buses appear to the central processing units(s) to have the same logical bus number.

32. A method of supporting a host-to-I/O bridge, the method comprising:

interfacing at least two host buses to a central processing unit(s) and a host-to-I/O bridge in a core logic;

interfacing at least two I/O buses having the same logical bus number to at least two I/O devices and the host-to-I/O bridge; and partitioning the host-to-I/O bridge into multiple partitions for effectively producing multiple computing units.

33. The method of claim 32, further comprising setting bit values in the core logic for activating and deactivating the partitioning.

34. The method of claim 32, further comprising setting a state of a crossbar switch in the core logic for effectuating the partitioning.

* * * * *